United States Patent Office 2,940,956
Patented June 14, 1960

2,940,956

N-CYANOACETYL-N'-ACRYLYL AND METH-ACRYLYL HYDRAZINES, AND POLYMERS THEREOF

Donald A. Smith, Rochester, N.Y., assignor to Eastman Kodak Company, Rochester, N.Y., a corporation of New Jersey No Drawing. Filed Nov. 7, 1957, Ser. No. 694,925

10 Claims. (Cl. 260—78)

This invention relates to acrylic acid hydrazides containing a cyanoacetyl group, to polymers thereof, and to a process for preparing these compounds.

The new class of compounds of the invention are represented by the following general structural formula:

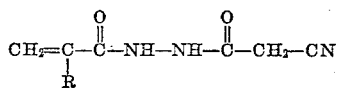

wherein R represents a hydrogen atom or an alkyl group of 1 to 4 carbon atoms, e.g. methyl, ethyl, propyl, isopropyl, butyl, etc. groups. The new compounds above described are valuable intermediates for the preparation of other useful compounds, especially as they are readily homopolymerized and copolymerized to resinous products which are particularly useful as vehicles for light-sensitive materials, for example, for silver halide photographic layers. These resinous products are hydrophilic in character some being soluble in water and some being soluble in organic solvents such as dioxane. The water-soluble members show thermally reversible gelation, but are hardenable and rendered permanently insoluble by treatment with formaldehyde and dialdehydes such as succinaldehyde, adipaldehyde, etc. With certain aromatic aldehydes, they also give light-sensitive resins and/or polymeric dyes.

It is, accordingly, an object of the invention to provide a new class of acrylic compounds. Another object is to provide resinous polymers of the same. Another object is to provide light-sensitive photographic materials wherein the resinous polymers of the invention function as vehicles. Another object is to provide processes for preparing the said compounds and materials. Other objects will become apparent hereinafter.

In accordance with the invention, I prepare the acrylic acid hydrazides defined above by reacting acrylyl or methacrylyl chloride or anhydrides thereof with cyanoacethydrazide ($H_2N$—$NH$—$CO$—$CH_2$—$CN$), at a temperature of from about 15°–100° C., followed by separation of the crystalline hydrazide product from the reaction mixture by conventional means of separation, for example, precipitation into a non-solvent such as water and recrystallization from a solvent such as ethanol. The proportions of the reactants may vary so that one or the other will be present in slight excess of equivalent quantities, but approximately equimolar proportions have been found to give good results with the acid chlorides, whereas with the acid anhydrides an excess of the anhydride is more advantageous. The reaction may be carried out at normal, reduced or above atmospheric pressures in a batch, continuous or semi-continuous manner.

The polymerizations of the new compounds of the invention alone or conjointly with one or more other monoethylenically unsaturated, polymerizable organic compounds is accelerated by heat, by actinic light and by polymerization catalysts which are known to promote the polymerization of vinyl and other unsaturated compounds such as a peroxy catalyst represented by acetyl peroxide, benzoyl peroxide, tertiary butyl hydroperoxide, hydrogen peroxide, ammonium persulfate, sodium persulfate, potassium persulfate, persulfuric acid, sodium perborate, and other alkali-metal perborates, the water-soluble salts of percarbonic acid, the water-soluble salts of perphosphoric acid, etc. Other useful polymerization catalysts are boron trifluoride and azo-bis-nitriles. Mixtures of one or more of the mentioned catalysts can be employed. An activating agent such as sodium bisulfite or metabisulfite and a chain regulator such as an alkyl mercaptan can be used, if desired, in conjunction with the polymerization catalysts.

The polymerizations can be carried out in mass or dispersed in a non-solvent for the monomers, but preferably they are carried out in water or in an organic solvent such as dioxane wherein the compounds of the invention are soluble, the viscous solutions or dopes obtained being precipitated into a non-solvent for the polymeric product, for example, into methanol, diethyl ether, and the like. The separated polymeric product is then washed and dried. Where the polymerizable monomers and polymers are insoluble, an emulsion technique in water can advantageously be employed using emulsifying agents such as salts of higher fatty acids, e.g. sodium or potassium stearate, palmitate, etc., ordinary soaps, salts of higher fatty alcohol sulfates, e.g. sodium or potassium lauryl sulfate, sodium or potassium stearyl sulfate, salts of aromatic sulfonic acids such as alkylnaphthalene sulfonic acids, etc. For bead or granular polymerization relatively poor dispersing agents such as starch, methylated starch, gum arabic, polyvinyl alcohol, partly hydrolyzed polyvinyl acetate, etc. can be employed. The polymerizations are facilitated by stirring, shaking or tumbling the polymerization mixtures.

The new monomers of the invention readily copolymerize with each other in any proportions or with one or more other polymerizable compounds containing the group $CH_2$=$C$< to give high molecular weight resinous copolymers, for example, any of the new compounds with vinyl and isopropenyl esters of saturated fatty acids of 1 to 18 carbon atoms, e.g. vinyl acetate, isopropenyl acetate, vinyl butyrate, vinyl stearate, etc., vinyl esters of aromatic carboxylic acids, e.g. vinyl benzoate, styrene, vinyl chloride, vinylidene chloride, N-vinyl pyrrolidone, a vinyl alkyl urethane, e.g. vinyl ethyl urethane, a vinyl imide, e.g. vinyl phthalimide, acrylic acid and its anhydride, amide, N-alkyl amides, nitrile and the methyl, ethyl, butyl, benzyl and phenyl esters, etc. and the corresponding methacrylic acid and derivatives, β-methacryloxyethyltrimethyl ammonium methosulfate, etc. The homopolymers and copolymers of the invention are soluble in one or more volatile solvents such as water, acetone, methyl ethyl ketone, dioxane, acetonitrile, dimethyl formamide, dimethylacetamide, etc., but can be insolubilized by treatment with formaldehyde and various dialdehydes. The copolymers of the invention can contain variable amounts of each comonomer, for example, from 2 to 98% by weight of the new unsaturates (hydrazides) and from 98 to 2% by weight of one or more of the above-mentioned other unsaturated, polymerizable organic compounds. The temperature of the polymerizations can vary widely, but advantageously from about 25–100° C. Those copolymers wherein acrylic acid, an alkyl acrylate such as n-butyl acrylate or an acrylic amide such as acrylamide as comonomers with the new hydrazides, are outstanding for use as vehicles for light-sensitive materials, for example, silver halide, and are preferred. Particularly useful in this respect are the ternary copolymers comprising from about 2–15% by weight of a hydrazide of the invention, from 70–80% by weight of an alkyl acrylate, e.g. n-butyl acrylate, and from 4–15% by weight of acrylic acid. While the presence of as little as 0.5% by weight of the new hydrazides in any of the mentioned copolymers shows some hardening, it has been found that for photographic purposes a quantity of 2% or more of the hydrazides is required to bring about the desired rapid insolubilization when the polymer solution or coated layer thereof is treated with alkaline formaldehyde.

EXAMPLES 4–8

A series of ternary copolymers of butyl acrylate, acrylic acid and N-cyanoacetyl-N'-methacrylylhydrazine, wherein the proportions of components were varied, were prepared by the general procedure described in Example 3. The following table lists the proportions, the catalyst, the nitrogen content of the resulting ternary copolymer product, and the weight percent of the hydrazide component in the copolymer as calculated from the nitrogen value.

TABLE

| Example | n-Butyl Acrylate, grams | Acrylic Acid, grams | Hydrazide, grams | Catalyst | Percent N in Copolymer by Weight | Percent Hydrazide in Copolymer by Weight |
|---|---|---|---|---|---|---|
| 4 | 20 | 5.0 | 2.0 | Azo-bis-isobutryonitrile | 1.23 | 4.9 |
| 5 | 40 | 7.0 | 5.0 | Potassium Persulfate | 1.35 | 5.4 |
| 6 | 40 | 7.0 | 8.0 | ----do---- | 2.10 | 8.4 |
| 7 | 20 | 3.5 | 2.0 | Azo-bis-isobutyronitrile | | |
| 8 | 40 | 2.0 | 3.0 | Potassium Persulfate | | |

The following examples will serve to illustrate further the manner of practicing the invention.

EXAMPLE 1

*Preparation of N-cyanoacetyl-N'-acrylylhydrazine*

To a suspension of 20.0 g. (0.20 mole) of cyanoacethydrazide in 50 ml. of dimethylformamide was added 18 g. (0.20 mole) of acrylyl chloride. The temperature rapidly rose to 60° and solution occurred. The contents of the flask were stirred and 25 ml. of triethylamine added to 20° C. After several days standing, the syrupy mass was treated with 150 ml. of water, and the resulting solid collected. Recrystallization from ethanol yielded a pale yellow solid melting at 188° C. Analysis showed that the product was essentially pure N-cyanoacetyl-N'-acrylylhydrazine containing by weight 46.7% of carbon, 4.8% of hydrogen and 26.9% of nitrogen compared with calculated for $C_6H_7N_3O_2$ of 47.0%, 4.6% and 27.5%, respectively.

EXAMPLE 2

*Preparation of N-cyanoacetyl-N'-methacrylylhydrazine*

To 10 g. (0.10 mole) of cyanoacethydrazide was added 20 g. (0.13 mole) of methacrylic anhydride with stirring. A mildly exothermic reaction took place with the formation of solid material. The mass was stirred intermittently for one-half hour, then warmed briefly on the steam bath. An addition of 100 ml. of ethanol was made and the whole heated until solution was complete. On cooling, the solution deposited colorless crystals melting at 138–140° C. Analysis of this product indicated that it was essentially pure N-cyanoacetyl-N'-methacrylylhydrazine containing by weight 50.0% of carbon and 25.6% of nitrogen compared with calculated for $C_7H_9N_3O_2$ of 50.3% and 25.1%, respectively.

EXAMPLE 3

A mixture of 20 g. of butyl acrylate, 5.0 g. of acrylic acid, 2.0 g. of N-cyanoacetyl-N'-acrylylhydrazine prepared as in Example 1, 0.20 g. of azobisisobutyronitrile, and 25 ml. of dioxane were placed on the steam bath and treated with small amounts of ethanol until solution was complete. Heating was continued until polymerization began, when the flask was removed and allowed to stand 2 hours. The polymer was isolated by solution in dioxane and precipitation in water. The nitrogen content of the ternary copolymer product was found to be 1.02% which corresponds to approximately 3.7% by weight of recurring units of N-cyanoacetyl-N'-acrylylhydrazine contained therein, the remainder of the copolymer molecule being recurring units of butyl acrylate and acrylic acid in about the same ratio as that of the monomers in the starting polymerization mixture.

EXAMPLE 9

A solution of 5.0 g. of N-cyanoacetyl-N'-methacrylylhydrazine and 0.5 g. of potassium persulfate in 40 ml. of water was kept at 60° for one hour. The viscous dope was diluted with water and precipitated in methanol. Aqueous solutions of this homopolymer showed thermally reversible gelation and could be rendered permanently insoluble by treatment with formaldehyde or dialdehydes.

In place of the N-cyanoacetyl-N'-methacrylylhydrazine, there may be substituted in the above example an equivalent amount of N-cyanoacetyl-N'-acrylylhydrazine to give the corresponding resinous homopolymer having generally similar properties of thermally reversible gelatin and hardening to insolubility by treatment with formaldehyde or dialdehydes such as succinaldehyde.

EXAMPLE 10

A solution of 4.0 g. of N-cyanoacetyl-N'-methacrylylhydrazine, 1.0 g. of acrylic acid, and 0.3 g. of potassium persulfate in 30 ml. of water was kept at 60° for 40 minutes. The viscous solution was diluted with water and precipitated in methanol. The white fibrous product was identified as a copolymer of approximately 75% by weight of N-cyanoacetyl-N'-methacrylylhydrazine and 25% by weight of acrylic acid; it was readily insolubilized by treatment with formaldehyde.

EXAMPLE 11

A solution containing 4.0 g. of N-cyanoacetyl-N'-methacrylylhydrazine, 1.0 g. of β-methacryloxyethyltrimethylammonium methosulfate, 0.3 g. of potassium persulfate, and 30 ml. of water were kept at 60° for one hour. The product was isolated by precipitation in methanol, yielding 4.5 g. of colorless, fibrous polymer which was identified as a copolymer of approximately 80% by weight of N-cyanoacetyl-N'-methacrylylhydrazine and 20% by weight of β-methacryloxyethyltrimethylammonium methosulfate. An aqueous solution of the copolymer was rapidly insolubilized by treatment with alkaline formaldehyde.

EXAMPLE 12

A solution of 4.0 g. of N-cyanoacetyl-N'-methacrylylhydrazine, 1.0 g. of acrylamide, 0.3 g. of potassium persulfate in 30 ml. of water was kept at 60° for one hour, then poured into methanol. The product was a colorless, fibrous polymer weighing 4.3 g. and was identified as a copolymer of approximately 75% by weight of N-cyanoacetyl-N'-methacrylylhydrazine and 25% of acrylamide. An aqueous solution of the copolymer was insolubilized by treatment with alkaline formaldehyde.

EXAMPLE 13

The following example illustrates the use of the polymers of the invention as vehicles for silver halide emulsions.

A silver bromoiodide emulsion was made by the general method of Trivelli and Smith, Photographic Journal, 79, pages 330–1 (1939), using a gelatin derivative silver halide peptizer prepared according to H. C. Yutzy and G. F. Frame, U.S. Patent No. 2,614,928, dated October 21, 1952. The vehicle was composed of 200 g. of the ammonium salt of the ternary copolymer of Example 4, comprising butyl acrylate, acrylic acid and N-cyanoacetyl-N'-methacrylylhydrazine, and 50 g. of gelatin per mole of silver. Adipaldehyde was employed as a hardener in the proportion of 4 g./mole of silver. The pH of the emulsion when coated was 6.6. The emulsion was coated on a suitable film base such as a rubbed cellulose triacetate sheet on a warm block and dried in about 5 minutes by means of forced warm air.

After aging for 3 days at 72° F. and at 50% relative humidity, a portion of the coating was exposed for 1/25 second through a step wedge to light of 3000° K. color temperature, developed for 5 minutes in a developer having the following composition:

| | |
|---|---|
| Water _____ cc__ | 750 |
| p-Methylaminophenol sulfate _____ g__ | 0.3 |
| Sodium sulfite (desiccated) _____ g__ | 38.0 |
| Hydroquinone _____ g__ | 6.0 |
| Sodium carbonate monohydrate _____ g__ | 22.5 |
| Potassium bromide _____ g__ | 0.9 |
| Citric acid _____ g__ | 0.7 |
| Sodium bisulfite _____ g__ | 1.4 |

Water to make a total volume of 1000 cc.

The developed coating was then fixed in a hypo (sodium thiosulfate) fixing bath having the following composition:

| | |
|---|---|
| Water _____ cc__ | 500 |
| Sodium thiosulfate _____ g__ | 240.0 |
| Sodium sulfite (desiccated) _____ g__ | 10.0 |
| Sodium bisulfite _____ g__ | 25.0 |

Water to make a total volume of 1000 cc.

which was diluted 1:1 with water and adjusted to a pH of 6.6, washed with water and dried. A very clean film showing eleven steps resulted.

In place of the ternary copolymer of Example 4, there may be substituted in above Example 13, other water-soluble salts of the hydrazine polymers of the invention such as the alkali-metal salts, e.g. the sodium or potassium salts, the alkanolimine salts, e.g. ethanolamine, and the like, as well as other similar copolymers of the invention such as those of Examples 5, 6, 7 and 8, as well as the aforementioned homopolymers and binary copolymers, to give light-sensitive emulsions and coatings thereof on suitable film bases that have generally similar photographic characteristics.

While the preferred compounds of the invention have been indicated as primarily useful as vehicles for silver halide emulsions, it will be understood that the other polymers illustrated by the examples are also useful, alone or with gelatin, as filter layers, as overcoating layers, as backing layers, as interlayers, etc. in photographic elements. Coloring and filling materials may also be incorporated with the said polymers, if desired. Other polymers of the invention which are hydrophobic in character such as copolymers of the hydrazide monomers of the invention with a greater amount of, for example, acrylonitrile or N-alkyl methacrylamides such as N-methyl methacrylamide, can be spun to fibers, coated into sheets or molded into shaped articles, with or without added coloring materials, plasticizers, fillers, and the like.

What I claim is:

1. A hydrazide represented by the following general formula:

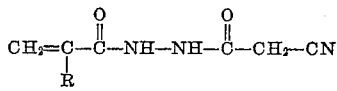

wherein R represents a member selected from the group consisting of a hydrogen atom and an alkyl group of 1 to 4 carbon atoms.

2. N-cyanoacetyl-N'-acrylylhydrazine.
3. N-cyanoacetyl-N'-methacrylylhydrazine.
4. A polymer of a hydrazide represented by the following general formula:

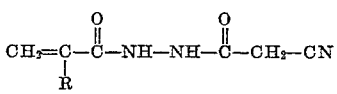

wherein R represents a member selected from the group consisting of a hydrogen atom and an alkyl group of 1 to 4 carbon atoms.

5. Poly-N-cyanoacetyl-N'-acrylylhydrazine.
6. Poly-N-cyanoacetyl-N'-methacrylylhydrazine.
7. A copolymer of from 2 to 98% by weight of N-cyanoacetyl-N'-methacrylylhydrazine and 98 to 2% by weight of acrylic acid.
8. A copolymer of from 2 to 98% by weight of N-cyanoacetyl-N'-methacrylylhydrazine and 98 to 2% by weight of acrylamide.
9. A copolymer of from 2–15% by weight of N-cyanoacetyl-N'-methacrylylhydrazine, from 70–80% by weight of an alkyl acrylate wherein the alkyl group contains from 1 to 4 carbon atoms, and from 4–15% by weight of acrylic acid.
10. A copolymer of from 2–15% by weight of N-cyanoacetyl-N'-methacrylylhydrazine, from 70–80% by weight of n-butyl acrylate and from 4–15% by weight of acrylic acid.

References Cited in the file of this patent

UNITED STATES PATENTS

| | | |
|---|---|---|
| 2,400,532 | Blake et al. | May 21, 1946 |
| 2,486,241 | Arnold | Oct. 25, 1949 |
| 2,606,832 | Alles et al. | Aug. 12, 1952 |
| 2,611,765 | Dickey | Sept. 23, 1952 |